Aug. 13, 1968 R. F. PFOST ET AL 3,397,289

MAGNETIC TRANSDUCER HEAD MOUNT

Filed Feb. 8, 1965 2 Sheets-Sheet 1

INVENTORS
ROBERT FRED PFOST
WALTER EARL LOCK

BY Robert Mednick

ATTORNEY

MAGNETIC TRANSDUCER HEAD MOUNT

Filed Feb. 8, 1965 2 Sheets-Sheet 2

INVENTORS
ROBERT FRED PFOST
WALTER EARL LOCK
BY Robert Mednick
ATTORNEY

United States Patent Office 3,397,289

Patented Aug. 13, 1968

3,397,289

MAGNETIC TRANSDUCER HEAD MOUNT

Robert Fred Pfost, Mountain View, and Walter Earl Lock, San Jose, Calif., assignors to MVR Corporation, Palo Alto, Calif., a corporation of California Filed Feb. 8, 1965, Ser. No. 431,083
5 Claims. (Cl. 179—100.2)

ABSTRACT OF THE DISCLOSURE

The magnetic transducer head device includes a transducer with an elongated plane surface and a pivot located between the lateral extensions of the ends of the transducer and on one side thereof. Spring means is applied to the device to provide an effective force centrally directed between the pivot and the ends of the transducer. When contacting a record medium, the transducer is not restrained from aligning itself with the surface of the record medium, and the transducer itself will be caused to turn about the pivotal fulcrum provided by the end of the pivot. Consequently, the transducer will be automatically oriented to follow the changing slopes of the record medium.

The present invention relates to a magnetic transducer head device, and more particularly relates to a magnetic transducer head device which contacts a non-flexible record medium during record and reproduce operations.

A magnetic transucer head for recording on and reproducing from a record medium comprises a closed magnetic circuit interrupted by a non-magnetic gap to contact the record medium. During recordation, varying magnetic fields are produced in the gap which correspond to the electrical signals applied to the magnetic transducer head inducing corresponding residual magnetism on the record medium. During reproduction, the magnetic transducer will derive from the record medium an electrical signal corresponding to the remanent magnetic induction recorded during the recording process.

For contact recording, i.e., when the magnetic transducer head contacts the record medium during operation, it is desirable that the edges of the working gap of the magnetic transducer head make good and uniform contact with the record medium. In the case where a flexible magnetic tape is used as the record medium, the magnetic tape can be caused to be flexed to conform it to the contacting surface of the magnetic transducer head. But if a non-flexible record medium is used, since the transducer head itself is not flexible, it is necessary to change the position of the transducer head itself to conform it to the contacting surface of the record medium.

If a non-flexible metallic disc is utilized as a record medium, then even though the contacting surface is made very smooth, variations in slope (even though gradual) will occur either due to variations on the contacting surface itself, or to slightly imperfect lateral alignment of the metallic disc on the driving motor, or to slightly imperfect axial rotation of the disc driving motor. Accordingly, the magnetic transducer head should change its orientation so that its operating gap edges continuously contact the contacting surface of the disc.

In video recording and reproducing, wherein a band width of several megacycles per second is recorded and reproduced on a narrow track width, and wherein high head to record medium speeds are utilized, the operating and design characteristics become very exacting. The magnetic transducer head device including its connected parts must then be very small and of light weight so that its mechanical resonant frequency is not reached during such fast speed operation, and also so that the magnetic head device has very little inertia to enable the head to rapidly follow the contacting surface of the record medium.

This invention provides a magnetic transducer head device capable of being used with a non-flexible record medium for video recording and reproducing. The device of this invention includes a specially shaped magnetic transducer head having an elongated contacting surface, a lateral pivot to provide a pivotal fulcrum, and spring means capable of causing the transducer to turn and to pivot to enable it to rapidly follow the changing slope of the record medium.

It is therefore an object of this invention to provide a magnetic transducer head device which is capable of being aligned to the changing slope on the contacting surface of a non-flexible record medium.

Another object of this invention is to provide a magnetic transducer head device for use with a non-flexible record medium whereby the contacting surface of the record medium reacts on the transducer head structure to align the operating gap edges of the transducer head to the contacting slope of the record medium.

Still another object of this invention is to provide a coplanar aligning magnetic transducer head device for use with a non-flexible record medium which is light in weight and capable of rapid alignment therewith.

A further object of this invention is to provide a coplanar aligning magnetic transducer head device for use with a non-flexible record medium and being reliable in operation and suitable for use for video recording and reproduction.

The novel features which are believed to be characteristic of the invention, both as to its organization and method of operation, together with further objects and advantages thereof, will be better understood from the following description considered in connection with the accompanying drawings in which two embodiments of the invention are illustrated by way of example. It is to be expressly understood, however, that the drawings are for the purpose of illustration and description only, and are not intended as a definition of the limits of the invention.

Figure 1:
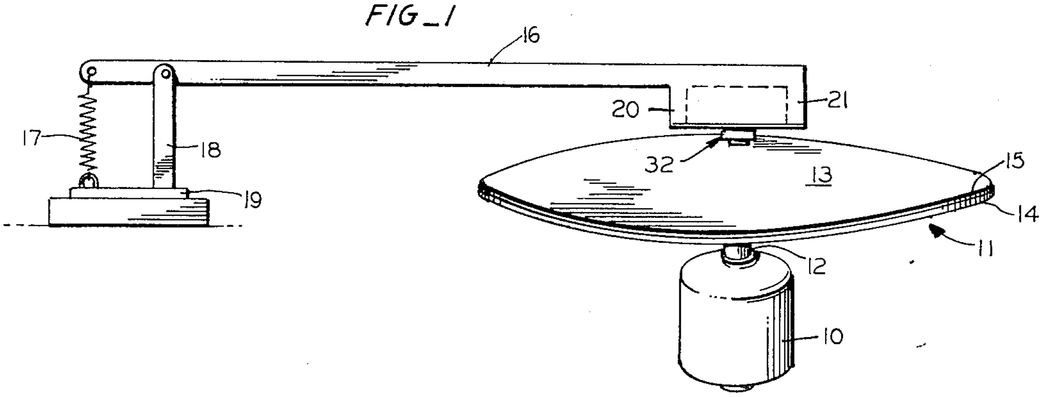
FIG. 1 is a perspective view of a magnetic recording system incorporating a magnetic transducer head device of this invention.

Referring now to the figures, there is seen in FIG. 1 a perspective view of a magnetic recording system incorporating a magnetic transducer head device of this invention. An electric motor 10 is provided to centrally rotate disc 11 via shaft 12 connected thereto. Disc 11 is utilized as a non-flexible record medium having a contacting surface 13. Disc 11 is made of non-magnetic material 14 such as aluminum or the like with a top layer of magnetizable material 15 deposited thereon.

Although a substantially flat record medium is herein illustrated as disc 11, it will be realized that various forms of a non-flexible magnetic record medium may be utilized. For example, flexible magnetic tape may be handled so that the portion thereof contacted by a magnetic transducer head is supported by a rigid plate or the like. In that event, the contacting surface of the magnetic tape presents an operating nonflexible record medium.

Force means to produce a predetermined force in the direction of the record member 11 is provided by a counterbalanced arrangement similar in general construction to a common phonograph arm. As seen in FIG. 1, arm 16 is connected at one end by a counterbalance spring shown diagrammatically as 17, and is pivotable at the end of fixed link 18. Rotatable platform 19 can turn to selectively position arm 16. The other end of arm 16 is seen to have two downwardly extending projections 20 and 21. Accordingly, it will be realized that arm 16 can be rotated by platform 19 to extend to a desired radial distance from the center of disc 11, and its weight is counterbalanced by spring 17 to produce a desired predetermined force directed downward toward contacting surface 13 of disc 11.

Figures 2, 3:
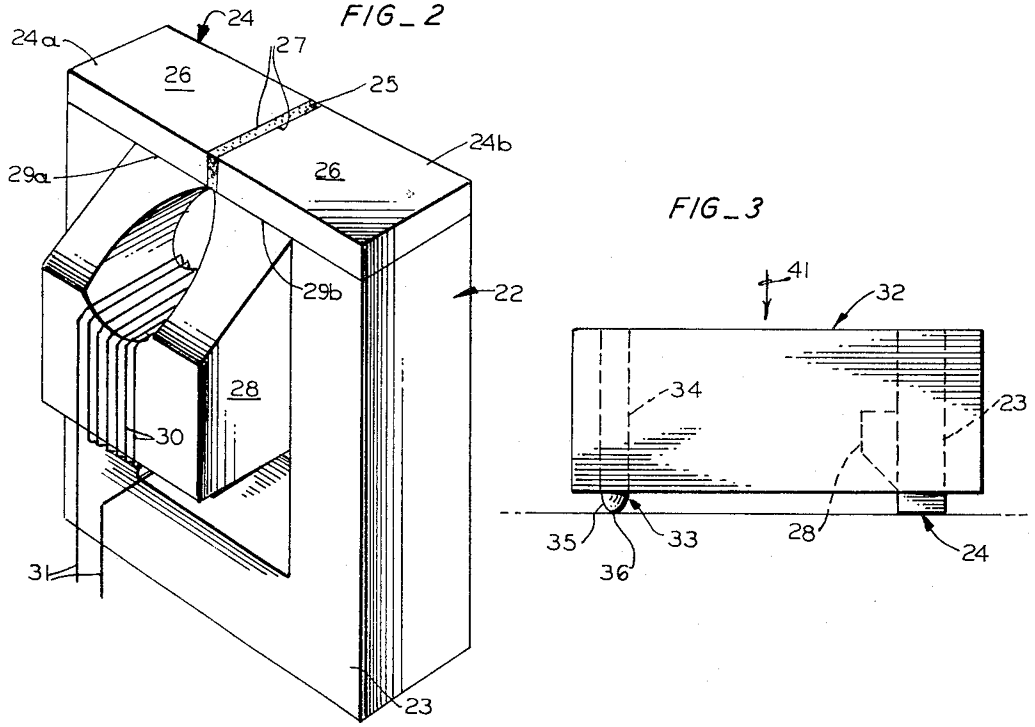
FIG. 2 is a view of a magnetic transducer head used in the device of this invention.
FIG. 3 is a view of the support member carrying transducer head and the pivot means connected thereto.

As seen in FIG. 2, the magnetic transducer head 22 utilized in this invention has a non-magnetic U-shaped yoke or frame 23, with its free ends closed by a relatively thin elongated rectangular bar 24. Bar 24 is formed of two sections **24*a* and 24*b* of magnetic material which define a transducer gap 25 therebetween filled with rigid non-magnetic material bonded to both sections 24*a* and 24*b*. U-shaped yoke 23 and bar 24 form a rigid mechanical enclosure with flat surface 26 extending along the length of bar 24, said flat surface 26 is the elongated surface for contacting the record member. It is to be noted that gap edges 27 lie in the plane of elongated surface 26. A U-shaped core 28 made of magnetic material having a high permeability has its ends 29*a* and 29*b* respectively secured to bar sections 24*a* and 24*b* on either side of gap 25. A coil 30 is wound around core 28 to complete transducer head 22 utilized in this invention. Suitable electrical signals may be applied via wires 31 of coil 30** for recordation, and received therefrom during reproduction.

Figure 4:
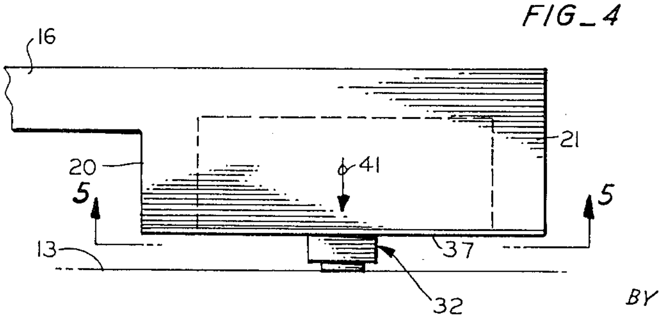
FIG. 4 is an enlarged view of the support member connected to the arm as seen in FIG. 1.
Figure 5:
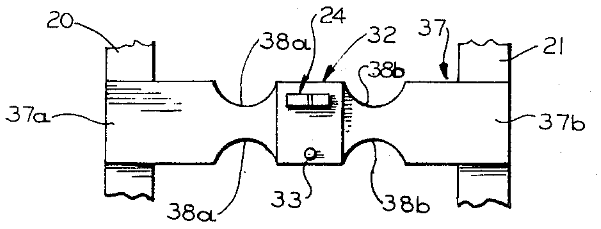
FIG. 5 is a view along lines 4—4 of FIG. 4 and showing the bottom view of the spring means connected to the support member.

Magnetic transducer head 22 is fixedly mounted in a box-shaped support or housing 32 on one side thereof as seen in FIG. 3. A pivot member generally designated as 33 is seen to include a shaft 34 terminated by a jewel bearing 35 such as a ruby having a contacting tip or end 36 to provide a pivotal fulcrum. Pivot member 33 is fixedly connected to support 32 on the other side thereof so that its end 36 is in the same plane or coplanar with the elongated plane surface 26 of transducer head 22. As seen in FIG. 4, the top surface of housing 32 is cemented at the center of flat spring 37 which is the spring means of this embodiment. Also as seen in FIG. 5, the ends **37*a* and 37*b* of spring 37 are respectively cemented to downward projections 20 and 21. Spring 37 is seen to have curved cutouts 38*a* and 38*b* at either side and close to support 32 in order to facilitate rotational turning of housing 32**.

In order to traverse a single circular track, arm 16 is fixedly positioned to the desired radial distance from the center of disc 11, and disc 11 is rotated by motor 10. As disc 11 is rotated, the length of bar 24 of head 22 will be essentially tangent to the circular track traversed, and gap 25 of transducer head 22 will then define the traversed track. During record, an electrical signal applied to coil 30 via wires 31 will cause magnetic flux to be developed across gap 25 to induce residual magnetism in the layer of magnetizable material 15 under surface 13. During reproduction, transducer head 22 will derive from said traversed track a magnetic signal corresponding to the recorded signal.

The weight of arm 16 is counterbalanced by spring 17 for the desired contact pressure or force to be applied to disc contacting surface 13. Arm 16 counterbalanced by spring 17 and pivoted by link 18 comprise the force means to enable the contacting elongated surface 26 of transducer head 22 and end 36 of pivot member 33 to simultaneously contact surface 13 of record member 11. Said predetermined contact pressure or force produced by arm 16 is directed downward at the ends of projections 20 and 21 to apply said force to spring 37 connected to the ends of said projections.

Figure 6:
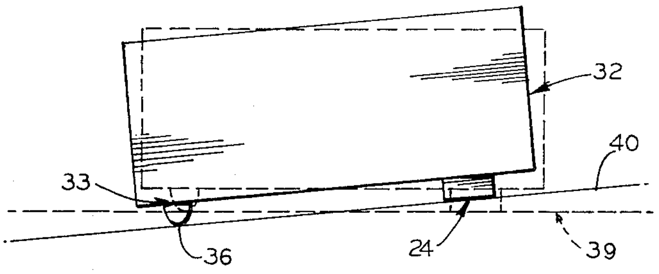
FIG. 6 is a view illustrating the alignment of the transducer head when the record medium is at a slope transverse to its direction of movement.
Figures 7, 8:
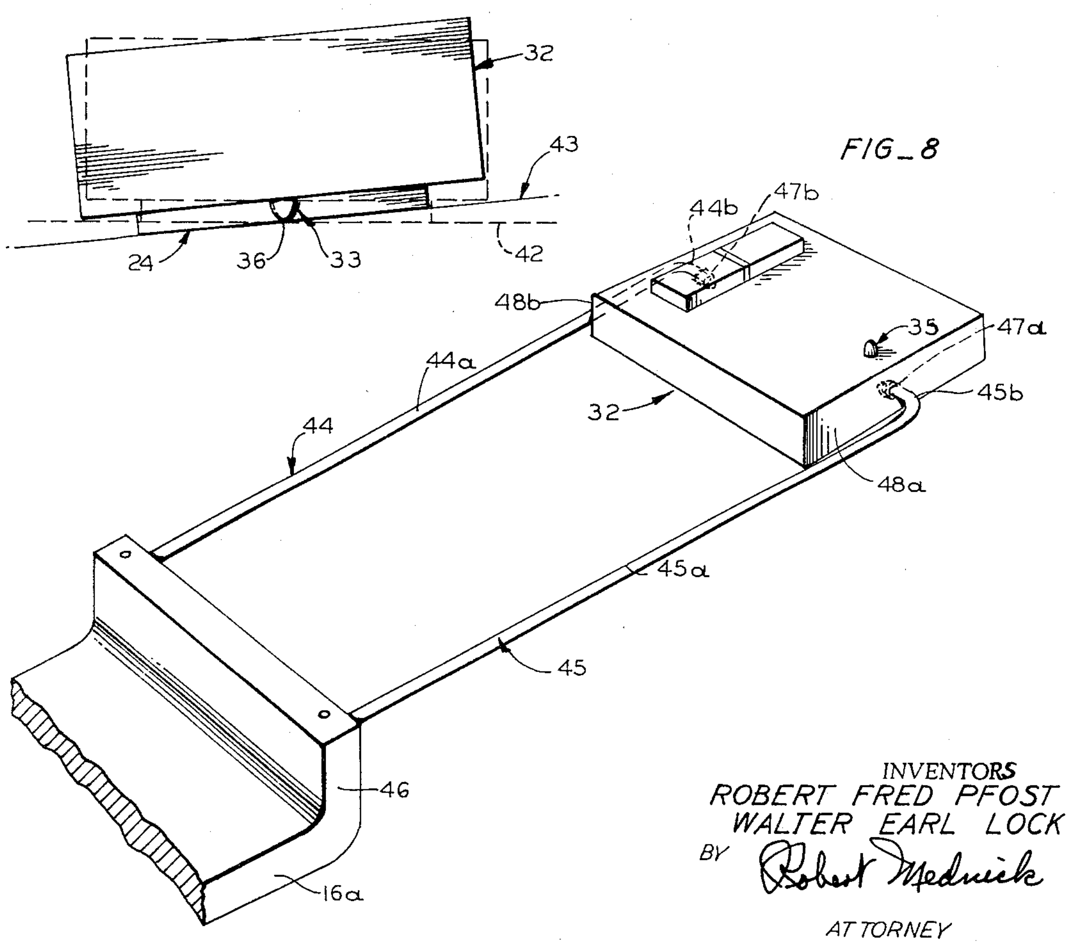
FIG. 7 is a view illustrating the alignment of the transducer head when the record medium is at a slope in the direction of its movement.
FIG. 8 is an enlarged view of another spring means used with a magnetic transducer head arrangement illustrating another embodiment of this invention.

In addition to transmitting said contacting force to housing 32 and thereby to transducer head 22 and pivot member 33, spring 37 can cause transducer head 22 to follow the changing contacting slope on record member or disc 11. Spring 37 can flex in between its ends laterally (transverse to the length of contacting surface of the magnetic transducer head) to allow transducer head 22 to be aligned with the lateral slopes existing on disc 11. FIG. 6 illustrates this lateral alignment. If the slope of disc 11 changes from that of dotted line 39 to solid line 40, then spring 37 will laterally flex to turn or rotate housing 32 so that both end 36 of pivot member 33 and elongated surface 26 of head 22 maintain contact with surface 13 of disc 11. In this figure the transducer head and pivot member are shown by dotted lines and solid lines for slope 39 and slope 40, respectively. Spring 37 can also flex to align transducer head 22 with the longitudinal slopes (i.e., along the length of the contacting surface of the transducer head) contacted. It is to be noted that spring 37 applies essentially equal elastic forces on both sides of housing 32. The resultant spring force or pressure is then directed downward between the ends of the length of the contacting surface 26 of transducer head 22 and intermediate said contacting surface 26 and end 36 of pivot member 33. This resultant force is represented in the figures by arrow 41. Accordingly, spring 37 will also flex to allow head 22 to pivot with tip or end 36 acting as a fulcrum to align the length of contacting surface of transducer 22 with the longitudinal contacted slopes. FIG. 7 illustrates such longitudinal alignment and shows by dotted lines the position of the transducer head and pivot members for one slope 42, and another position of the transducer head and pivot members for another slope 43. As the edges 27 of gap 25 are in the elongated contacting plane surface of transducer head 22, these gap edges 27 will be in the coplanar contacting relationship with the contacting surface of nonflexible disc 11. If the slope of disc 11 thereafter changes either laterally or longitudinally as above described, then the position of transducer head 22 will correspondingly change and coplanar alignment will continue throughout operation. Therefore, the device of this invention will follow the changing slopes of the record member.

It will be noted that the above-described spring means allows a kind of gimballing action in allowing the transducer head to turn or rotate with two degrees of freedom so that the elongated plane surface of transducer head 22 aligns with the slopes of contacting surface 13 of disc 11.

FIG. 8 shows another spring means to produce a similar transmitted spring force gimbal-like mounting. In this embodiment, the spring means may be used with previously described transducer head 22 and pivot member 33 connected to housing 32. Instead of using a flat spring as previously described, two identical wire springs 44 and 45 are substituted. A modified arm **16*a* is shown to be similar as previously described but only having a single downward projection 46. Wire spring 44 has a straight portion 44*a* fixedly connected to one side of projection 46 and has a turned end 44*b* extending inwardly with its tip held in the bearing surface provided by an indent 47*a* in the center of side 48*a* of housing 32. Similarly wire spring 45 has a straight portion 45*a* fixedly connected to the other side of projection 46 and has a turned end 45*b* extending inwardly with its tip held in the bearing surface provided by an indent 47*b* in the center of side 48*b* of housing 32. The inwardly turned ends 44*b* and 45*b* of springs 44 and 45 allow transducer head 22 to align itself with the contacting slope of surface 13 along its length by pivoting at the fulcrum formed by the top 36 of pivot member 33. The straight portions 44*a* and 45*a* of springs 44 and 45 allow transducer head 22 to pivot laterally to conform to the lateral slope of the contacting surface 13 as previously described. Both wires 44 and 45 are positioned to also provide a downwardly extending force which is directed between the boundaries defined by the length of contacting surface 26 of transducer head 22 and pivot end 36**. Accordingly, the structure of this invention with this other spring arrangement will operate similarly to the previously described embodiment.

Having herein described the invention, what is claimed as new is:

1. A magnetic transducer device for aligning the operating gap edges of a magnetic transducer head to be coplanar with the contacting surface of a non-flexible record medium, said device comprising: a magnetic transducer head having an elongated plane surface for contacting the record medium, said head having magnetic material an operating gap with edges in said elongated plane surface; a support connected to the head; a pivot connected to said support and having an end coplanar with and lateral to the elongated plane surface of the head, said pivot being located between the lateral extensions of the ends of the elongated plane surface of the head in order to provide a pivotal fulcrum therefor; force means to produce a force in the direction of the record medium; and spring means connected to the force means and to the support to receive the force and transmit an elastic force to the support directed between the end of the pivot and the elongated plane surface of the head to simultaneously contact the contacting surface of the record medium.

2. A magnetic transducer device for aligning the operating gap edges of a magnetic tranducer head to be coplanar with the contacting surface of a non-flexible medium, said device comprising: a magnetic transducer head having an elongated plane surface for contacting the record medium, said head having magnetic material defining an operating gap with edges in said elongated plane surface; a support connected to the head; a pivot connected to said support and having an end coplanar with an lateral to the elongated plane surface of the head and positioned between the ends of the transducer head on one side thereof to provide a pivotal fulcrum therefor; force means to produce a predetermined force in the direction of the record medium; and spring means connected to the force means and to the support to receive the predetermined force and transmit a resultant elastic force to the support centrally directed between the end of the pivot and the longitudinal axis of the elongated plane surface of the head to simultaneously contact the contacting surface of the record medium.

3. A magnetic transducer device for aligning the operating gap edges of a magnetic transducer head to be coplanar with the contacting surface of a non-flexible record medium, said device comprising: a magnetic transducer head having an elongated plane surface for contacting the record medium, said head having magnetic material defining an operating gap with edges in said elongated plane surface; a support connected to carry the head; a pivot connected to said support and having an end coplanar with and lateral to the elongated plane surface of the head, and being located between the lateral extensions of the ends of the elongated plane surface of the head in order to provide a pivotal fulcrum therefor; force means to produce a force in the direction of the record medium; and spring means connected to the force means to receive the force and transmit an elastic force to the support directed between the end of the pivot and the longitudinal axis of the elongated plane surface of the head to cause the end of the pivot and the elongated plane surface of the head to simultaneously contact the contacting surface of the record medium, said support being connected to the spring means to be elastically pivoted about the fulcrum provided by the end of the pivot to enable the edges of the operating gap of the head to follow the slope of the contacting surface of the record medium in the direction of the elongated surface of the head, and to be elastically turned to enable the edges of the operating gap of the head to follow the slope of the contacting surface of the record medium in a direction transverse to the elongated surface of the head.

4. A magnetic transducer device for aligning the operating gap edges of a magnetic transducer head to be coplanar with the contacting surface of a non-flexible record medium, said device comprising: a magnetic transducer head having an elongated plane surface for contacting the record medium, said head having magnetic material defining an opearting gap with edges in said elongated plane surface; a support connected to carry the head; a pivot connected to said support and having an end coplanar with and lateral to the elongated plane surface of the head, said pivot being located between the lateral extensions of the ends of the elongated plane surface of the head in order to provide a pivotal fulcrum therefor; force means to produce a predetermined force in the direction of the record medium; and spring means connected to the force means to receive the predetermined force and transmit a resultant elastic force to the support centrally directed within the boundaries defined by the end of the pivot and the longitudinal axis of the elongated plane surface of the head to cause the end of the pivot and the elongated plane surface of the head to simultaneously contact the contacting surface of the record medium, said support being connected to the spring means to be elastically pivoted about the fulcrum provided by the end of the pivot to enable the edges of the operating gap of the head to follow the slope of the record medium in the longitudinal direction of the elongated surface of the head, and to be elastically turned to enable the edges of the operating gap of the head to follow the slope of the contacting surface of the record medium in a direction transverse to the elonagted surface of the head.

5. A magnetic transducer device comprising: a nonflexible record medium; a magnetic transducer head having an elongated plane surface for contacting the contacting surface of the record medium, said head having magnetic material defining an operating gap with edges in said elongated plane surface; a support connected to carry the head; a pivot connected to said support and having an end coplanar with and lateral to and between the ends of the elongated plane surface of the head to provide a pivotal fulcrum therefor; force means to produce a force in the direction of the record medium; and spring means connected to the force means to receive the force therefrom and transmit an elastic force to the support directed between the end of the pivot and the elonagted plane surface of the head to cause them to simultaneously contact the contacting surface of the record medium, said support being connected to the spring means to be elastically pivoted about the fulcrum provided by the end of the pivot to enable the edges of the operating gap of the head to follow the slope of the contacting surface of the record medium in the direction of the elongated surface of the head, and to be elastically turned to enable the edges of the operating gap of the head to follow the slope of the record medium in a direction transverse to the elongated surface of the head.

References Cited

UNITED STATES PATENTS

| | | | |
|---|---|---|---|
| 2,680,785 | 6/1954 | Franklin | 179—100.2 |
| 2,802,905 | 8/1957 | Taris | 179—100.2 |
| 3,349,384 | 10/1967 | Kohn | 179—100.2 |

BERNARD KONICK, *Primary Examiner.*

H. STECKLER, *Assistant Examiner.*